United States Patent [19]
Charlebois et al.

[11] 4,405,083
[45] Sep. 20, 1983

[54] MOULDING APPARATUS FOR ENCAPSULATING CABLE SPLICES

[75] Inventors: Leonard J. Charlebois, Kanata; Fred A. Huszarik, Ottawa, both of Canada

[73] Assignee: Northern Telecom Limited, Montreal, Canada

[21] Appl. No.: 359,899

[22] Filed: Mar. 19, 1982

[51] Int. Cl.³ .............................................. B29C 6/04
[52] U.S. Cl. ...................................... 249/97; 249/95; 264/275; 264/313; 425/116
[58] Field of Search ..................... 425/116; 249/95, 96, 249/97, 122, 85, 91, 94; 264/313, 275, 278, 276; 277/235 R, 11, 58, 102, 188 R, 189

[56] References Cited

U.S. PATENT DOCUMENTS

| | | | |
|---|---|---|---|
| 3,387,075 | 6/1968 | Wilcox | 264/276 |
| 3,497,224 | 2/1970 | Pippert | 277/235 |
| 3,516,679 | 6/1970 | Schmitt | 277/58 |
| 4,139,204 | 2/1979 | Howe | 277/189 |
| 4,292,267 | 9/1981 | Haynes | 264/263 |
| 4,314,960 | 2/1982 | Hass | 264/313 |

Primary Examiner—Donald E. Czaja
Assistant Examiner—Mary A. Becker
Attorney, Agent, or Firm—R. J. Austin

[57] ABSTRACT

Moulding apparatus with a passage between mould parts to locate an article extending through the mould parts and into the mould cavity. A device is disposed within the passage for gripping and sealing against the article. This device is resiliently compressible and has gripping and sealing ribs projecting into and spaced along the passage. Parts of the device lying between the ribs define parts of the passage of substantially equal diameters for use with an article, e.g. a cable with an outside diameter which is also substantially equal to the passage diameter at those parts of the passage.

3 Claims, 5 Drawing Figures

MOULDING APPARATUS FOR ENCAPSULATING CABLE SPLICES

This invention relates to moulding apparatus and is particularly concerned with moulding apparatus for moulding encapsulations around spliced or other connections between conductors of a telecommunications cable.

Various ideas have been suggested and are being used for the encapsulation of telecommunication cable splices. In one practical method of forming an encapsulation around a splice in a telecommunications cable, an encapsulation is moulded around the spliced area in the manner described in U.S. patent application Ser. No. 129,246 filed Mar. 11, 1980 in the name of L. J. Charlebois. In the formation of an encapsulation in the manner described in application Ser. No. 129,246, ends of the cable project through holes provided between mould parts to enable the cable ends to be located partly within the mould. Hence the encapsulation extends partly over the connections between conductors and also around an adjacent part of the cable jacket. While the above method has been found to be extremely practical, difficulty has been experienced with the efficient sealing and clamping of cable parts which extend through the openings provided in the mould. Efficient sealing of the cable between the mould parts is necessary to prevent the molten material forming the encapsulation from escaping along the cable, which action causes an unsightly appearance to the finished encapsulation. Also, although a seal is required, it should not grip too effectively because of possible damage being incurred to the exterior surface of the cable jacket. With gripping seals that have been used previously, it has been found that variation in the cable diameter has led to the clamping and sealing effect not being satisfactory from one moulding operation to another. Furthermore, the cable tends to move in the direction of plastic flow during mould filling in cases where the gripping of the cable is not sufficient and, in such cases, incomplete encapsulations may result. Another problem which has been found with existing seals is that they have not prevented lateral movement of the cable end and the conductors to be encapsulated if a lateral load has been applied to the part of cable projecting from the mould. Hence, if the cable projecting from the mold has been urged laterally in one direction, the cable has tended to pivot within the seal whereby the parts of the cable and conductor ends within the mould have moved laterally in the opposite direction. This has lead to the parts within the mould being eccentrically disposed with regard to the encapsulation. Such an effect is found particularly when making an encapsulation upon one end of a cable when the cable is supported at one end of the mould only and extends in cantilever fashion into the cavity. Such an encapsulation is as described in a patent application Ser. No. 359,897 entitled "Load Coil Assemblies for Telecommunications Cables" in the name of L. J. Charlebois and filed concurrently with this present application.

The present invention provides a moulding apparatus including a new sealing and gripping arrangement which overcomes the above problems.

According to the present invention, a moulding apparatus is provided comprising at least two mould parts which define a mould cavity and an opening to the cavity for location therein of an element to be disposed partly within and partly outside the mould cavity, and a resiliently compressible element gripping and sealing device disposed to seal around said element and to grip it and retain it in fixed position during a moulding operation, said device having a plurality of annular ribs projecting into and spaced axially along the passage to compressibly seal and grip against the element.

In a preferred arrangement for use of the mould with encapsulations upon cables, the passage is circular in cross-section, the ribs having substantially equal inside diameters and parts of the device lying between the ribs are of larger and substantially equal diameters. In use, it is intended that the cable passing through the passage should have a diameter substantially equal to that of the parts of the device lying between the ribs whereby said parts merely seal against the cable without any substantial gripping effect. In use of the device in this manner, the parts of the device lying in the planes of the annular ribs are compressed by the gripping force whereas the parts lying between the ribs have negligible radical compression. Should the cable lying outside the mould be flexed laterally, then the parts of the device in the rib plane or planes lying closer to the exterior of the mould would be eccentrically compressed in a radial direction. However, as the parts of the device lying between rib planes are initially subjected to negligible compression, they easily absorb any compressive load imported to them at one face by one adjacent distorted part lying in a rib plane without transmitting any substantial load to the other face and into the other adjacent part lying in the rib plane. Hence the radial compression of the part in one rib plane has little or no influence upon the compression to which the next part in a rib plane is subjected. It follows that the inner ribs are not compressibly affected by any compression applied to the ribs and material in rib planes lying towards the mould exterior whereby the elements within the mould are maintained by the seal in their desired positions.

One embodiment of the invention will now be described, with reference to the accompanying drawings, in which.

Figure 1:
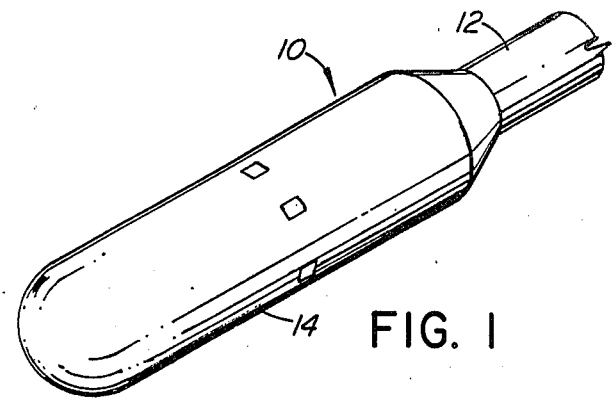
FIG. 1 is an isometric view of a loading coil assembly which has been encapsulated by a moulding apparatus according to the embodiment.
Figure 2:
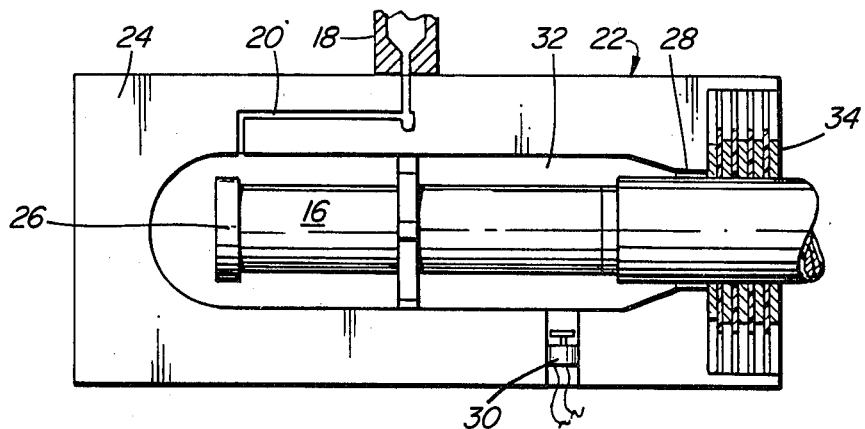
FIG. 2 is a cross-sectional view through a moulding apparatus showing a sub-assembly of loading coils and cable end located in a mould cavity before encapsulation.

As shown in FIG. 1, a loading coil assembly 10 comprises a short length of cable 12, i.e. a few feet, having an encapsulation 14 moulded around loading coils (not shown) mounted in an array upon supports around the inner surface of a support tube 16 (FIG. 2).

The encapsulation 14 is provided around the loading coil assembly in the manner described in a patent application Ser. No. 359,897 entitled "Loading Coil Assemblies for Telecommunications Cable" in the name of L. J. Charlebois and filed concurrently with this present application. Briefly, the encapsulation is forced in molten form by moulding apparatus comprising a plastics extruder 18 through passages 20 in a mould 22 of the apparatus. One part 24 of the mould is shown in FIG. 2 which is a view through the mould along the interface between the mould part 24 and another mould part 26 (see FIG. 5). As shown by FIG. 2, the end of the cable 12 passes through a circular opening 28 formed by two opposing semicircular openings in the mould parts 24 and 26 to locate the loading coils within the tube 16 within the mould cavity. As disclosed in the above-referred to application and as covered by the claims of an application entitled "Moulding of Plastics Articles" in the names of L. J. Charlebois and F. A. Huszarik under Ser. No. 354,774, filed Feb. 4, 1982, there is a switch 30 provided in the mould to stop operation of the extruder 18 after each moulding operating without the need for an operator. Operation of the switch keeps the moulding pressure in the mould low, i.e. up to or around 16 lbs./sq.in., by cutting off operation of the extruder exactly when required. Thus the low pressures cannot crush the cable end within the mould during encapsulation.

Figure 3:
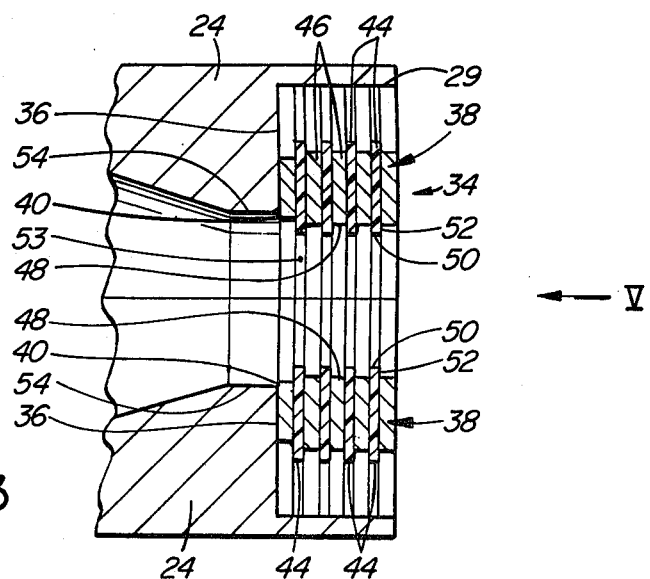
FIG. 3 is a view similar to FIG. 2 showing part of the moulding apparatus on a larger scale and before insertion of the cable end into the mould.
Figure 4:
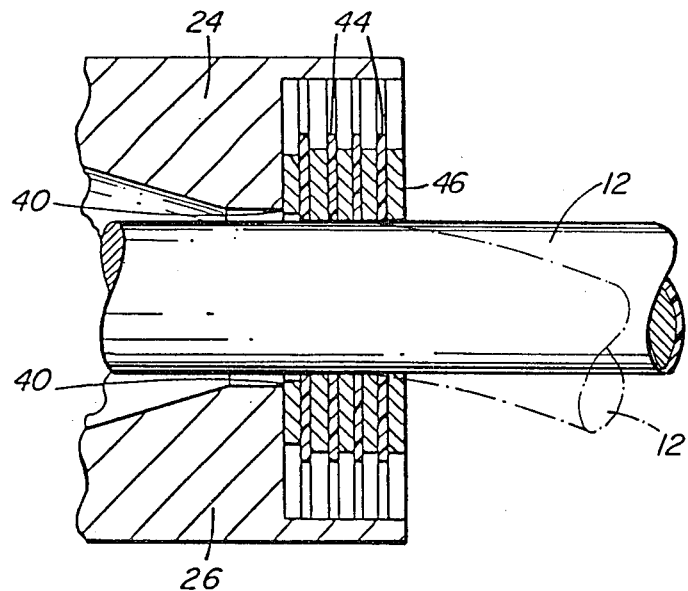
FIG. 4 is a view similar to FIG. 3 after incorporation of the cable end.
Figure 5:
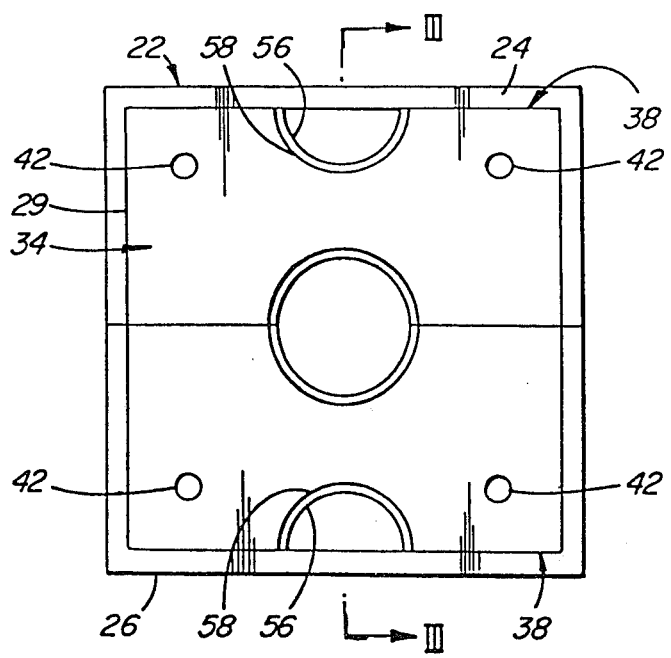
FIG. 5 is an end view of the mould in the direction of arrow V—V in FIG. 3.

The moulding apparatus according to the present invention is provided with a gripping and sealing device for the cable 12 as it passes through the passage 28 into the mould cavity 32. This device 34, the position of which is shown in the mould in FIG. 2, is shown in greater detail in FIGS. 3 and 4. As shown by FIGS. 3 and 4, the passage 28 is of cylindrical shape from its inner end up to a shoulder 36 at which the passage opens into a rectangular bore 29 formed between mould halves (FIG. 5).

The device 34 comprises two separate structures mounted one in each part of the bore 29 formed in each mould part 24 and 26. Each of these structures 38 is formed by a plurality of side-by-side resiliently compressible plates which are held to a metal backing plate 40 by two holding screws 42 which pass through the structures and into the plate 40. This plate 40 is held against the shoulder 36 by a separate screw (not shown). As is clear from FIG. 3, each structure 38 has plates 44 alternating with plates 46. Each plate 46 defines a semicircular groove 48 along one edge facing across the mating surface of the mould halves, and the grooves 48 are of the same diameter as one another and are axially in alignment. Similarly, the plates 44 also define semicircular grooves 50 which are in alignment. The edges of plates 44 in one mould half contact those of the other mould half to form annular ribs 52 extending into a passage 53 formed between grooves of the plates, the ribs 52 being provided because the grooves 50 are of smaller diameter than grooves 48. The plates are each formed from a polymeric material such as Neoprene rubber and, in this particular instance, have a hardness of 62 as measured on a Type A durometer. Alternatively, other polymers may be used which are chemical and heat resistant for use in the moulding operation which is to be performed. These polymers also have the required resilience and compression characteristics. It should be noted that each of the grooves 48 has a smaller radius than the inner end 54 of the mould parts 24 and 26 forming the shoulder 36 of the passage 28.

In use, it is intended that the device 34, together with the mould, is to be used for the encapsulation of a loading coil assembly upon a cable 12 which has an outer diameter substantially equal to the diameters of the grooves 48 in the plates 46. In this case, as shown by FIG. 4, the ribs 52 are compressed upon the cable 12 and seal and grip the cable in spaced positions along it. As the cable 12 has substantially the same diameter as the grooves 48, then there should be merely a sealing contact between the surface of the grooves and the cable with negligible compression of the plates 46. Hence the plates 46 do not grip the cable to prevent its axial movement. Axial movement is prevented solely by the ribs 52. Should the cable exteriorally of the mould be moved laterally to the chain-dotted position in FIG. 4, then this will further compress one side of a rib 52 adjacent to the outside of the mould and possibly also the next rib 52. However, the lateral compression of the plate 44 carrying the rib does not influence the compression of adjacent ribs because the load imposed upon the plate 44 is dissipated through the adjacent plate 46 whereby the next adjacent plate 44 is not affected by the compression. Hence, each plate 46 acts as a buffer between one plate 44 and the next because the plates 46 are not normally under any substantial compression and the force for extra compression of one plate 44 is not transmitted to the next plate 44.

It follows from the above description that if the cable is flexed as just described, then the inner end of the cable, i.e. into the mould cavity, is not affected by this deflection and the ribs 52 retain the cable in substantially the same position towards the shoulder 36 as if no lateral deflection of the cable outside the mould had taken place. Thus the cylinder 16 containing the load coil assembly within the mould is retained in its desired location without any tendency to be distorted in position from that desired. Further to this, when the molten material is forced into the mould from the extruder 18, the axial forces upon the cable applied by the molten material do not move the cable lengthwise outwardly of the mould because of the gripping action of the ribs 52.

To obtain the gripping action by the device 34, the polymeric material used may be of any suitable hardness. It has been found in a practical embodiment using 62 hardness on Type A durometer that the plates 44 and 46 may be of 0.125" and 0.25" thickness respectively. In the construction being considered, there are four plates 44 whereby only four ribs 0.125" wide actually contact the cable. This has been found sufficient to prevent axial movement of the cable under low pressure moulding conditions, e.g. up to 16 lbs/0" while the seal is provided by the intimate engagement of the compressed ribs with the cable jacket and also by the slight if negligible sealing pressure of the plates 46 upon the jacket.

It will be noticed that as shown in FIG. 5, each of the plates 44 and 46 is provided with a semicylindrical groove on opposite edges. The grooves at one edge are of different radius from those at the other whereby if a cable is to be encapsulated which has a different diameter, then the grooves 50 and 48 may be be replaced by grooves 56 and 58 on the other edges of the plates. The plates may be easily altered in position merely by unscrewing them from the plate 40. If the structure 38 in each of the mould parts is assembled permanently by adhesively bonding the plates together, then turning these structures around is a simple operation. The bonding of the plates together makes negligible difference to the operation of the structures as the plates 46 are still not compressed by the cable. The material along the surfaces of the plates 46 may be compressed to a degree by the compression of the plates 44, but it has been found that the thickness of 0.25" is sufficient to dissipate the extra compressive load upon one plate 44 into an adjacent plate 46 whereby the next plate 44 is negligibly influenced by that compression.

What is claimed is:

1. A moulding apparatus for moulding encapsulations upon cables comprising at least two mould parts which define a mould cavity and an opening to the cavity for location therein of a cable to extend through the mould and into the cavity, and a resiliently compressible element gripping and sealing device disposed within the opening to seal around said cable and grip it and retain it in fixed position during a moulding operation, said device formed as a diametrically split annulus composed of two structures each of which comprises two groups of planar resilient plates, the plates in one group alternating with those of the other and wherein the plates of one group have semi-circular extensions directed radially inwards of the opening and lying in the plane of its plate, each extension forming a radial rib between plates of the other group, and the ribs of each structure radially in alignment with and sealingly abutting against those of the other structure at the diametral split line to provide annular ribs within the annulus, said ribs being spaced axially along the opening by the plates of the other group of each structure to compressively seal and grip against the cable.

2. A mould according to claim 1, wherein the plates of each structure are bonded together.

3. A mould according to claim 2, wherein the plates of each structure are assembled by screw fitted means to a metal backing plate.

* * * * *